(12) United States Patent
Spiegler et al.

(10) Patent No.: US 6,728,728 B2
(45) Date of Patent: Apr. 27, 2004

(54) UNIFIED BINARY MODEL AND METHODOLOGY FOR KNOWLEDGE REPRESENTATION AND FOR DATA AND INFORMATION MINING

(76) Inventors: Israel Spiegler, 58 Bilu Street, Raanana 43581 (IL); Roy Moshe Gelbard, 50 Kosovsky Street, Tel-Aviv (IL)

( * ) Notice: Subject to any disclaimer, the term of this patent is extended or adjusted under 35 U.S.C. 154(b) by 346 days.

(21) Appl. No.: 09/909,963

(22) Filed: Jul. 23, 2001

(65) Prior Publication Data

US 2002/0087567 A1 Jul. 4, 2002

Related U.S. Application Data

(60) Provisional application No. 60/220,250, filed on Jul. 24, 2000.

(51) Int. Cl.$^7$ .............................................. G06F 17/30
(52) U.S. Cl. ............................ 707/103 R; 707/6; 707/7
(58) Field of Search ................. 707/103 R, 1, 707/100, 200, 102, 7, 10, 6; 706/53

(56) References Cited

U.S. PATENT DOCUMENTS

| | | | |
|---|---|---|---|
| 5,267,349 A * | 11/1993 | Barabash et al. .............. 706/53 |
| 5,649,181 A | 7/1997 | French et al. |
| 5,706,495 A | 1/1998 | Chadha et al. |
| 5,926,815 A * | 7/1999 | James, III ....................... 707/7 |
| 6,078,920 A * | 6/2000 | Tan et al. ....................... 707/10 |
| 6,161,105 A * | 12/2000 | Keighan et al. ............. 707/100 |
| 6,438,559 B1 * | 8/2002 | White et al. ............. 707/103 R |
| 6,442,561 B1 * | 8/2002 | Gehrke et al. ............... 707/102 |
| 6,446,074 B1 * | 9/2002 | Miller et al. ................. 707/100 |
| 6,502,086 B2 * | 12/2002 | Pratt .............................. 707/1 |
| 6,549,901 B1 * | 4/2003 | Loaiza et al. .................. 707/7 |
| 2001/0049693 A1 * | 12/2001 | Pratt .......................... 707/200 |
| 2002/0087567 A1 * | 7/2002 | Spiegler et al. ............. 707/100 |

FOREIGN PATENT DOCUMENTS

WO      WO01/48638 A2 *  5/2001   ........... G06F/17/30

OTHER PUBLICATIONS

Spiegler et al "Storage and Retrieval Considerations of Binary Data Bases" Information Processing & Management, vol 21,3 pp 233–254, 1985.

Gebard et al "Hempel's Raven Paradox: A Positive Approach to Cluster Analysis" Computers & Operations Research, vol. 27.4 Apr. 2000.

Dice "Measures of the Amount of Ecologic Asociation between species" Ecology 1945,vol. 26, pp297–302.

* cited by examiner

*Primary Examiner*—Frantz Coby
(74) *Attorney, Agent, or Firm*—Mark M. Friedman

(57) ABSTRACT

A knowledge tool, which includes a binary dataset for representing relationship patterns between objects and methods of its use. The use of the binary representation is based on an algorithm of data clustering according to binary similarity indices, which are derived from the binary matrix. Applications which are based on the binary representation and its compression capability include data mining, text mining, search engines, pattern recognition, enhancing data exchange rate between computerized devices, database implementation on hardware, saving storage space and adaptive network addressing.

24 Claims, 5 Drawing Sheets

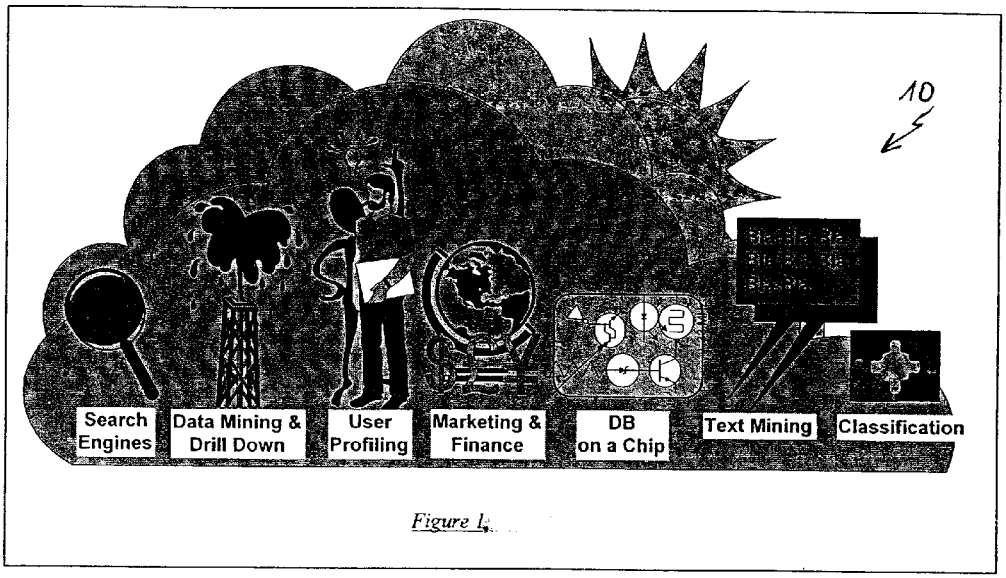
Figure 1.
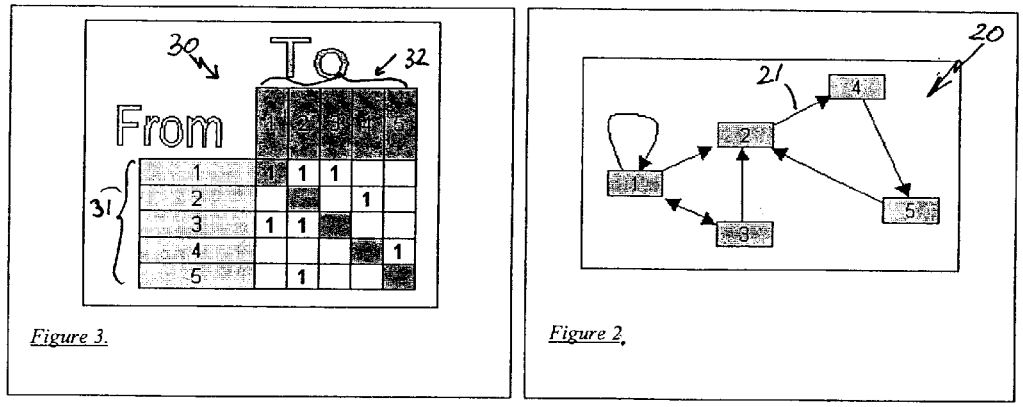
Figure 3.
Figure 2.

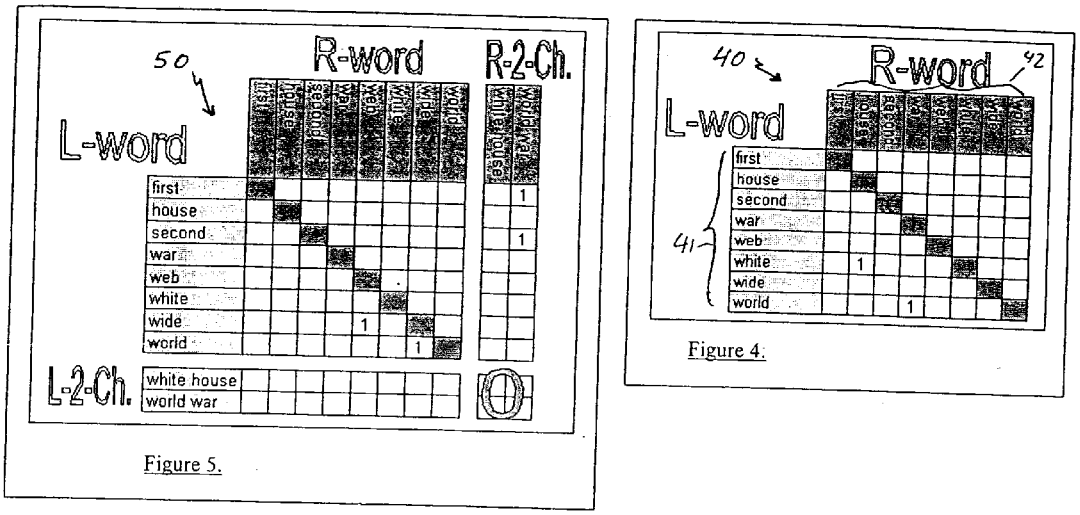
Figure 4.
Figure 5.
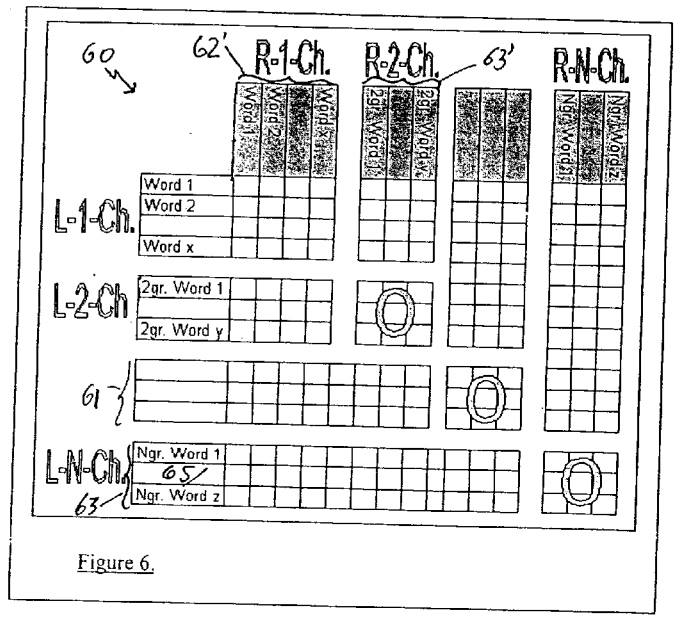
Figure 6.

UNIFIED BINARY MODEL AND METHODOLOGY FOR KNOWLEDGE REPRESENTATION AND FOR DATA AND INFORMATION MINING

This claims the benefit of Provisional Application No. 60/220,250, filed Jul. 24, 2000.

BACKGROUND OF THE INVENTION

The present invention relates to methods for managing information in general and to the binary representation and information mining in particular.

The idea of a binary database was first introduced by Spiegler and Maayan in a seminal paper of 1985 (Spiegler, I., and Maayan, R., "Storage and Retrieval Considerations of Binary Data Bases", *Information Processing & Management*, Vol. 21,3 pp. 233–254, 1985), hereinafter; Spiegler and Maayan.

The original binary database concept described in Spiegler and Maayan proposed a method for storage and retrieval of alphanumeric data found in files and databases as an alternative to inverted file for a storage and retrieval technique in database management.

The "binary idea" was then ahead of time. Today, the application of the binary idea in bit maps or bit vectors, have come to age with several vendors developing software to support access and retrieval to databases and data warehouses. Those developments fall short of full realization of the original binary database concept as they use bit vectors at the attribute level without linking among attributes or providing an overall binary database view.

U.S. Pat. No. 5,649,181 to French et al. describes a method for using bit vectors for indexing database columns (attributes) for the purposes of information access and retrieval. The patent was implemented in a software product called Sybase IQ, aimed for use as an on line analytical processing (OLAP) engine.

U.S. Pat. No. 5,706,495 to Chadha et al. describes the use of a vectorized index on which a series of bit-vector operations are performed for optimizing SQL queries.

Some firms apply today bit vectors in their products. For example, Sand Technologies, in a package called Nucleus, uses bit maps for improving high performance ad hoc interactive queries.

The present invention carries the binary database concept to new territories and applications, which include representation of graphs, keywords contexts, to data and text mining, knowledge discovery in databases (KDD), and up to a database on a chip. The binary/positive representation of data can be used to extract behavior patterns, characterizing consumer segments, select symptoms identifying a certain disease, support target marketing campaign, perform DNA analysis, and many more.

A recent article by Gelbard and Spiegler's (Gelbard. R., and Spiegler, I., "Hempel's Raven Paradox: A Positive Approach to Cluster Analysis", *Computers & Operations Research*, Vol. 27.4, April 2000), hereinafter; Gelbard and Spiegler, enhances and advances the binary database approach even more and presents a model for similarity evaluation and a method for data clustering which is based on positive attributes of data.

The present invention carries the similarity evaluation and the clustering method far ahead, by improving similarity indexing and clustering techniques The present invention provides an innovative approach to the use of the binary data representation in the following areas:

| | |
|---|---|
| Marketing | Segmentation: customers, products, events and Direct Marketing. Customer Relationship Management (CRM), lifetime value, retention. Market Basket Analysis and consumer behavior. |
| Internet | Search Engines: keyword, names, natural language, categories, contexts. |
| User Profiling | Personalization of service in e-commerce and related applications, locating most likely users to respond to a product or service. |
| Management | Support decision making in data warehousing, data marts and OLAP. |
| Finance | Customization of investment packages, classification of customers, market trend detection/alert. |
| Banking | Fraud detection, credit policy, customer defaults, defection |
| Insurance | Plan tailoring, risk identification, focusing |
| Telecomm | Customer management, churning modeling, customer retention/defection in cellular, line and Internet communication. |
| Medicine | DNA segmentation, pharmacology, diagnosis. |
| Human Resources | Characterization, classification, prioritization. |
| Database on a chip | Implementation of databases in hardware. Relevent data may become part of palm, cellular, or network devices in the near future. |
| CBR | Case Base Reasoning-a method for comparing and handling cases such as emergencies, social crises and more. |

FIG. 1 to which reference is now made shows an overview 10 of new areas and applications in which the present invention is mostly useful.

SUMMARY OF THE INVENTION

In accordance to the present invention there is provided a knowledge tool for describing a relationship pattern between objects, comprising a binary representation for an interaction between the objects, the binary representation indicates an alleged influence of an object i on an object j by assigning a positive value to an element in an $i^{th}$ row and a $j^{th}$ column of a matrix in which the objects are set in a row and column format.

In accordance to the present invention there is provided a method to evaluate quantitatively a similarity or a distinction between at least two objects, comprising the stages of: (a) representing the objects by a binary representation in which attributes of the objects are features which are relevant to the similarity; (b) calculating a similarity index between the at least two objects, the similarity index is proportional to a number of positive attributes common to the at least two objects being represented by the binary representation.

In accordance to the present invention there is provided a method for preserving a compression capability of a database comprising the stages of: (a) representing the data in the database by a binary matrix; (b) interchanging an order between rows and an order between columns of the binary matrix, as to partition said binary matrix into approximate homogeneous sub-areas containing cells of "1" or "0" only; (c) excluding said approximate homogeneous sub-areas of said binary matrix so as to get a reduced binary matrix and loading said reduced binary matrix into a data storage space; (d) symbolizing the homogeneity pattern by a tree structure, and (e) changing the root of the tree structure in order to get a required feature of said tree structure.

In accordance to the present invention there is provided a method for grouping a plurality of objects according to their similarity, the method comprises the stages of: (a) representing the objects by a binary representation matrix with positive attribute values, in which the rows being the objects and the columns consist of attributes relevant to grouping; (b) calculating an index of similarity for each pair of objects among the plurality of objects; (c) building an object similarity matrix in which an entry of the matrix element of an intersection between two objects, is the index of similarity between the two objects, and (d) scanning the similarity matrix to chose pairs of objects having the similarity index of at least a pre-selected value, each of the chosen pair of objects consist a different clustering candidates respectively.

In accordance to the present invention there is provided a method for data mining comprising the stages of: (a) defining attributes which are considered a-priori by an expert opinion to be meaningful to a score of a data mining process; (b) reading raw data from operational database system and converting the data into objects of a binary representation in a binary matrix in which columns consist of the attributes; (c) performing positive clustering of the converted data according to a similarity which is based on the attributes to obtain number of groups, and (d) executing data mining within the groups.

In accordance to the present invention there is provided a method for text mining comprising the stages of: (a) defining attributes which comprises words considered a-priori to be included in a text as an N-chain phrase; (b) reading a free form text and performing initial parsing of the text; (c) identifying and reconstructing the binary N-chain phrase, and (d) retrieving the N-chain phrases in relevant contexts.

In accordance to the present invention there is provided a method for adaptive network addressing and routing, which comprises a binary representation of a state of connectivity between two addresses.

In accordance to the present invention there is provided a tool of data management between data warehouses and on line analysis processors, the tool comprises of a multi-dimension binary representation in which the dimension of the representation equals or exceeds a three-dimensional cube.

In accordance to the present invention there is provided a method for managing database in a storage space of a computer the method comprising the stages of: (a) representing the data in the database by a binary matrix; (b) interchanging an order between rows and an order between columns in said binary matrix as to partition said binary matrix into homogeneous sub-areas containing cells of "1" or "0" only, and (c) excluding said homogeneous sub-areas of said binary matrix so as to get a reduced binary matrix and loading said reduced binary matrix into the storage space of the computer.

It is further an object of the present invention to provide a binary representation for graphs, directed graphs, trees, automata, and connections and constraints between relations, classes, and/or records.

It is yet an object of the present invention to provide binary representation for keywords, names (people, places, products), terms, acronyms, aliases and synonyms.

It is still an object of the present invention to provide a binary representation in contexts, hierarchies, hypertexts, and mutual links between contexts within the scope of web pages and unstructured texts.

It is further still an object of the present invention to provide a feature extraction technique based on the binary representation.

It is further another object of the present invention to provide pattern recognition techniques about data based on the binary representation.

Other objects and benefits of the invention will become apparent upon reading the following description taken in conjunction with the accompanying drawings.

BRIEF DESCRIPTION OF THE DRAWINGS

The invention herein described, by the way of examples only with reference to the accompanying drawings, wherein:

FIG. 1. shows an overview for possible applications of the present invention;

FIG. 2. shows a graph relationship between objects;

FIG. 3. shows a positive binary representation of the graph relationship pattern shown in FIG. 2;

FIG. 4. shows a binary representation of a 2-chained phrase;

FIG. 5. shows a binary representation of a 3-chained phrase;

FIG. 6. shows a general structure of a binary n-chained phrase;

DETAILED DESCRIPTION OF THE EMBODIMENTS

Figure 7:
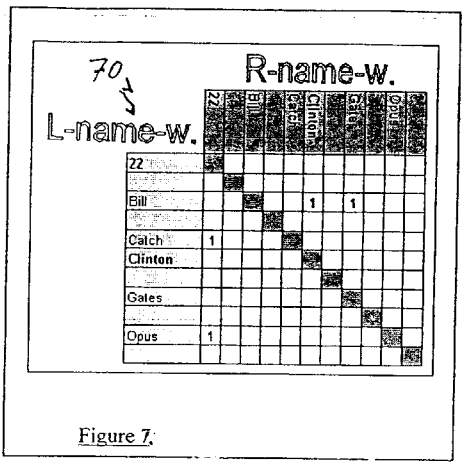
FIG. 7. shows a binary representation of a 2-chained name.

The present embodiments herein are not intended to be exhaustive and to limit in any way the scope of the invention, rather they are used as examples for the clarification of the invention and for enabling of other skilled in the art to utilize its teaching.

A binary database is a storage scheme wherein data appear in a binary form rather than the common numeric and alphanumeric formats. The database is viewed as N dimensional array relating "positive relations" between "atomic fields". Entries of the N dimensional array are either '1' or '0'. For example, in a two-dimensional matrix, having the rows representing entities and the columns representing all possible attribute values of the entities. Entries of this matrix which is referred to as a binary matrix, are either '1' or '0' indicating that a given entity has or lacks a given attribute value, respectively.

The assignment of "1" and "0" as values to the respective columns of attributes in an object row is referred as-a binary representation. In what follows, non-limiting examples for innovative perceptions of the scope of the binary representation are demonstrated:

EXAMPLE 1

A Binary Representation of Mutual Relationships Between Objects

FIG. 2 depict diagram symbolization 20 of mutual relationships between objects.

A relation between objects is defined as any assumed dependency of the state or outcome of an object on the outcome or state of another object.

In this embodiment an object generally includes a material or an intangible entity, or an event or a state. An object is characterized by at least one outcome or one relation, which is neither "physically" nor some property of it. Rather it is merely an attribute, which indicates whether according to our perception, an outcome of the object influences in any relevant way an outcome of some other object, or another outcome of the same object.

Preferably the objects are; entities of graphs, directed graphs, trees, automata classes, and/or records, while the relations can be: Connections, influences, conditional interactions and constraints.

In FIG. 2, a state or an outcome of an object is designated by a pointer (an arrow), which originates from this object, while any alleged influence on the state or outcome of an object is designated by a pointer-link pointing toward that object.

Thus an arrow (e.g. arrow 21 leaving a box 2 and pointing toward a box 4, symbolizes the fact that an object (or an outcome of an object), which is symbolized by box 2 influences an object, which is symbolized box 4.

FIG. 3 shows a binary recursive view of the data in FIG. 2 according to the present invention, indicating the representational power and versatility of the binary method.

In FIG. 3, the entries in the rows 31 and in the columns 32 of table 30 are lists of objects, symbolized by the boxes (e.g., box 2) shown in FIG. 2. Each entry at the matrix indicates start-point (at the object "owning" the related row) and end-point (at the object "owning" the related column). The same goes for each arrow emerging from each of the boxes in FIG. 2.

The presentation is non-procedural, providing a unique snapshot to a situation or a state. The implications of such representation are that all links presented by an isomorphism of a graph, tree or automata can be represented in a binary method yielding the many advantages of the new approach. As binary representation matches the internal storage of computer, it gives advantages such as direct access to any node, no pointers, lower storage volume and ease of calculation.

EXAMPLE 2

A Binary Representation of Phrases

The binary model can represent chains of free text, keywords, names (people, places, products), terms, acronyms, aliases, and synonyms. A name, in our context, is any string of characters that is a word, a proper name, a number, or a combination thereof. We define a name as a Binary n-Chained Phrase (BCP). It can compactly and efficiently depict pairs, triplets, and any chain of symbols, letters, words of length N, taking full benefits of the binary characteristics for representation and processing.

FIG. 4 shows a Binary 2-Chained Phrase, and illustrates a representation 40 of phrases like "white house" and "world war".

Consistent with example 1: The objects in column 41 are words (entities), with a possible positive attribute, of having any of the words in row 42 as their conjugated next word.

FIG. 5 illustrates a Binary 3-Chained Phrase representation 50 with the triplets: "first world war", "second world war", and "world wide web".

FIG. 6 shows the general structure 60 of a Binary N-Chained phrase, which is a natural extension to the lower case of Binary 3-Chained Phrase 50, shown in FIG. 5.

In FIG. 6, entities in sub-column 63 (a N-Binary Chained Phrase) are phrases, which are created by a possible incorporation of the phrases in any of the sub-rows 62' and 63' to the right-hand side of a phrase residing in a lower sub-column 61, thus creating a left N-generated word 65.

The incorporated words themselves in any sub-row, consist of a (1 to N-1) Binary Chained Phrase.

The representation 70 of names, made of single words, is illustrated in FIG. 7 representing the names: Bill Gates, Bill Clinton, Catch 22, and Opus 22.

Figure 8:
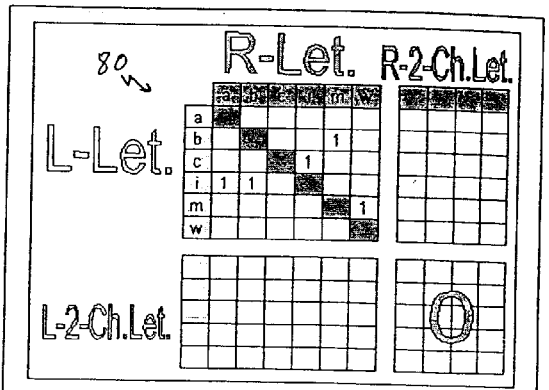
FIG. 8. shows a binary representation of a 3-chained acronym.

Acronyms, which are difficult to represent and detect in standard systems on the Internet, are readily represented in binary format. This is illustrated in representation 80 in FIG. 8 via a Binary 3-Chained Phrase with the acronyms CIA, IBM, and BMW. In addition to the advantages mentioned above, the binary representation enables the understanding of an acronym with partial data, including its correction when stated in error by users. Queries with incomplete data are also possible.

EXAMPLE 3

A Binary Representation of Contexts, Hierarchies, and Relationships Between Contexts As shown in example 1, all relationships that are isomorphism of a graph, tree, or automata can be represented by means of the binary model. Thus, advantages of binary form may be realized in context identification and processing.

The links for isomorphism of nets, i.e., context nets, semantic nets, are same as for graphs, and for hierarchies are same as of trees.

While simple and easily conceived, the binary representation provides a robust and general model without limiting the association of a concept to one context, or to a context in a fixed path. Thus, the binary model suits representation of chains, trees, hierarchies, and network in 1:1, 1:N, and N:M relationships.

Figure 9:
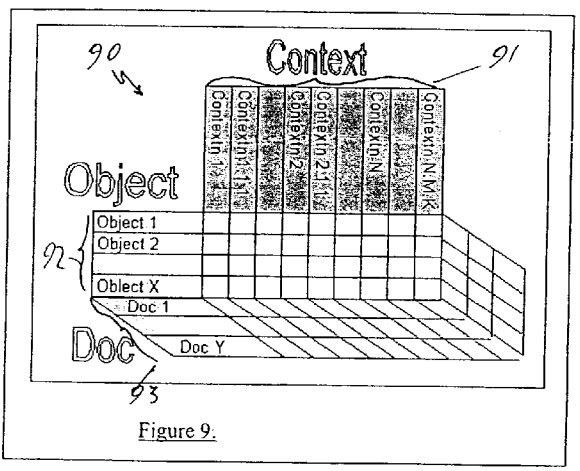
FIG. 9. shows a binary context cube.

FIG. 9 illustrates a binary context cube 90 having the following dimensions:

Context 91, which includes any node or path in a tree/graph/automata.

Object 92, which includes any N-chained phrase in all varieties.

Doc 93, which includes any document/page/address which is the target of mining.

Figure 10:
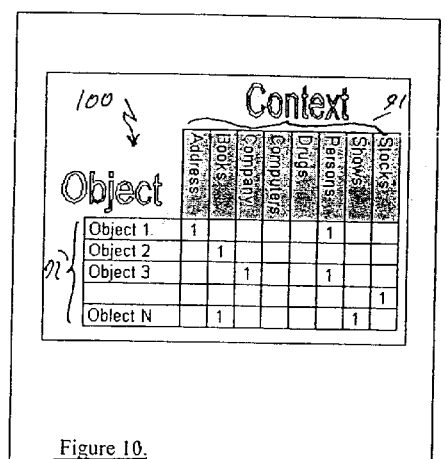
FIG. 10. shows the object-context slice of the cube shown in FIG. 9.

The three slices of cube 90 are:

The Context-Object projection 100 shown in FIG. 10, illustrates a binary map for mining possible contexts. It represents the context "dictionary": that is, the association of natural and technical expressions to the various contexts space.

The Object-Doc projection (not shown) is a binary map for mining possible expressions, including those not linked to given contexts.

The Doc-Context projection (not shown) is a map for mining possible contexts.

The binary representation demonstrated in the aforementioned examples is an essential aspect of the present invention. Once a binary representation of objects has been accomplished, many useful manipulations can be carried out with the data.

Non-limiting examples for applications of the binary representation are given below.

EXAMPLE 4

Binary Similarity Indexes to Measure Distance Between Members within a Group, two Groups, N Groups and M Members This embodiment of the present invention proposes a method for measuring distance between members records and groups, which is based on the use of a binary positive representation of data (the '1' bits only). Table 1 summarized the possible new possibilities of calculating such measure. Usually, similarity measures were done only between two records of data (Dice, "Measure of the Amount of Ecological Association between Species", *Ecology*, 1945, Vol. 26, pp. 297–302), hereinafter Dice.

The method suggested here is turning similarity into a full index and general basis for all clustering and classification techniques that are at the heart of data and text mining.

TABLE 1

Binary Similarity Measures

| | Type | Description | Source |
|---|---|---|---|
| 1 | 1:1 | Between two items (pairs) | Dice 1945 |
| 2 | 1:N | Between item and group | — |
| 3 | N:M | Between two groups | — |
| 4 | Π n | Between n groups | — |
| 5 | Π m | Between M items | — |

The basic calculation of similarity measures is explained in the Gelbard and Spiegler and will be repeated here in brief:

According to the present invention, a similarity index between two objects, which consist of a Positive Atom Distance (PAD) is introduced.

In PAD, the similarity between two objects which have binary sequences a and b is as follows:

$$0 \leq PAD = \frac{2Nab}{Na + Nb} \leq 1, \quad Na + Nb > 0$$

Where Na is the number of "1" in sequence a, Nb is the number of "1" in sequence b and Nab is the number of "1" common to a and b.

The result obtained PAD is thus an expression between 0 and 1, where 1 designates absolute similarity between the two objects and 0 designates an absolute diversity between the objects.

In order to calculate the distance between objects during a grouping process, a PGD (Positive Group Distance) was developed. The PGD index, an extension of PAD, enable to calculate the similarity between groups of any numbers of individuals using the original characteristics of the individuals, and not just between two individuals as with the PAD.

The PGD index expresses the degree of homogeneity (correlation/similarity) within any group of individuals. The PGD is defined as follows:

$$PGD = \frac{m * N_m}{\sum_{i=1}^{m} N_i}$$

where m is the individuals in the group. $N_m$ the number of features common to all m individuals in the group, or to a certain percent of the m individuals, i is the individual index from 1 to m and $N_i$ the number of positive features existing in an individual i within a group.

On top of the PGD calculation, a mechanism of evaluating similarity between at least two objects is set up. The mechanism includes adjustment of the similarity index according to several parameters such as: the number of positive-atomic-attributes, the record length, rarity of each attribute-value, and weight of each attribute-value.

The Within Classes Distance (WCD) is the division of the PGD standard deviation by the PGD average. Where the PGD is the distance of each sub-group members, found in every grouping-clustering cycle (see below). The WCD serves to evaluate the grouping factor obtained in each cycle and to compare different grouping in various cycles. The WCD, is therefor the Coefficient of Variations of the PGD. The lower the value of WCD the better is the grouping quality.

Other criteria for grouping quality are:

The Between Classes Distance (BCD), which is the "reciprocal" of the WCD. The BCD is the division of the BCD's standard deviation by the BCD's average found in every grouping-clustering cycle (see below). The BCD serves to evaluate the distinction between the sub-groups, obtained in each cycle and to compare different grouping in various cycles. The BCD, therefor is the Coefficient of Variations of the "reciprocal" PGD. A lower value represents better between group's distinction.

The Total Grouping Quality (TGQ), which is the division of the WCD by the 1/BCD. The lower the value of TGQ the better is the grouping quality with regard to the WCD and BCD aspects.

The ΔPGD which is the change of the PGD of a group, caused by changing group's member assignment, i.e. adding or deleting members of the group.

The ΔTGQ which is the change of the TGQ of an entire grouping, caused by different assignment of the sub-groups and their members.

EXAMPLE 5

An Algorithm for Clustering Data Records Based on Binary Similarity Indices, using Positive Attribute Values of Data All cluster analysis methodologies are based on a procedure to calculate a similarity index and a distance matrix between objects and on a grouping technique described below. Using the similarity index, it is possible to calculate a preliminary distance matrix, which represents the degree of similarity between the various objects in the data. The objects are then selectively assigned to different clusters by means of the grouping technique.

The grouping technique of objects in accordance with the present invention includes the following stages:

(a) First the binary representation of all the objects, which are candidates for grouping is accomplished in a binary matrix wherein objects are the records (rows of the matrix), and the features values of the objects having relevance to the grouping consist the fields (columns) of the matrix.

(b) Then, the PAD between all possible couples of objects is calculated (using the similarity index and the adjustment parameters) and an object distance matrix (called also-the similarity matrix) is constructed.

The object distance matrix (as the familiar distance table between cities) is a square matrix whose both row and column vectors are the object to be grouped, and the entries at any element (i;j) of the matrix is the PAD between object i and object j (only PAD values of half of the matrix, from one side of its diagonal, are needed).

(c) The object distance matrix is then scanned, in a descending order, to find couples of objects whose PAD matches or exceeds a pre-selected PAD value (threshold).

Any couple (pair of objects) is examined, on reaching it's PAD level, in order to decide whether to be assigned to an existing group, or to initialized a kernel of a new group, or to cause a merging of two existing groups.

If the initial scan of the object distance matrix shows e.g., that couples [a,b] and [c,d] have or exceed the pre-selected PAD, by the end of this first grouping cycle we will have two kernels [a,b] and [c,d], for two separate groups.

A group expands by a mechanism of "a group member brings a similar friend", e.g., with the aforementioned couples [a,b] and [b.e] which have or exceeds the pre-selected PAD, two possibilities arises:

The first one is that group [a,b] will be extended and thus the group [a,b,e] will be assembled. This occurs if and only if PGD and ΔPGD exceed the pre-selected thresholds.

The second possibility is delaying in the assignment of object e to a further cycle.

Two groups are merged by a mechanism of "common members", e.g., with the aforementioned couples, and the new couple [b,c], which have or exceeds the pre-selected PAD, two possibilities arises:

The first one is that the two groups [a,b] and [c,d] will be merged and thus the group [a,b,c,d] will be assembled. This occurs if and only if TGQ and ΔTGQ exceed the pre-selected thresholds.

The second possibility is leaving the two groups as they are.

The decision as to what clustering possibility to choose depends on the value of the aforementioned similarity and distinction measures which correspond to each of the respective possibilities.

(d) In the next cycle the PAD value is lowered, and new couples, which comply with the new PAD are formed. These new couples too, are judged via the aforementioned mechanism into existing groups or consisting kernels for new groups and vice versa.

Each time a group expands, its new PGD and its corresponding ΔPGD are calculated. TGQ and ΔTGQ of the entire grouping are calculated, as well, subjected to a procedure of local optimization, as a result of the exchange of newly joined members among the various groups.

The set, which represent the best grouping is the one which yields the minimum WCD and the maximal BCD i.e. the maximal TGQ.

(e) The grouping process comes to its end when the object distance matrix was scanned for the lowest acceptable PAD or when all objects were partitioned; what ever comes first.

The grouping mechanism which was employed here, can further be used in the following embodiments:

EXAMPLE 6

Feature Extraction Based on the Binary Clustering Capability

According to a unique aspect developed with the binary/positive representation model, it is possible to extract frequent features and attributes from large data sets for a given group of records. This ability is important for determining those attributes that characterize a group, which are usually invisible and implicit in the data. Once extracted, such features can then be used to determine whether e.g., a new person qualifies to become a member in a group, i.e., whether a new customer who applied for credit matches selectable features of a group of customers who defaulted in a bank system (called scoring).

Qualifying features are extracted based on a high frequency of their appearance within a group and low frequency of their appearance in other groups. The binary approach enables identifying drawing near or away from a desired context based on frequency of attributes relevant to that context. The idea here is to minimize intra-within group distance (increase similarity with the other group members) and maximize inter-between group distance (increase distinction with regard to other group members).

EXAMPLE 7

Pattern Recognition

Pattern recognition is an important branch of artificial intelligence. It aims to detect and identify patterns in large volume of data. When a group of data appears in an ordered or repetitive manner (with regard to coordinates, or to time) it represents a pattern.

The binary model for evaluating similarities provides a new direction in determining legitimate patterns, by using its Feature Extraction capabilities.

Based on qualifying features and binary similarity the model can be used in determining membership of individual data records to the various classes. This has application to computer vision, sound detection, handwriting interface and scanning.

EXAMPLE 8

No Information Loss (preserving) Compression Capability

The binary representation provides a unique compression capability with no information loss i.e., a preserving compression. Such compression impacts on storage volumes as well as on digital communication capacity.

The order of objects (row order) and the order of attributes-values (column order) at the binary matrix is immaterial to the binary representation. Thus it is possible to change the inter-row and inter-column order in the binary matrix to get a partitioning into homogeneous sub-areas containing cells which fully consist of "1" or of "0". The homogeneous sub-areas are excluded of the binary matrix.

The next step after the binary matrix reduction is to represent the homogeneity pattern of the matrix, i.e. representing the structure of the reduced binary matrix by a tree structure and then changing the root of the tree in order to get a balanced tree, or any other required feature of the tree. The tree structure enables direct and quick access to each matrix cell. The possibility to change the tree root enables adjusting and balancing the latency, i.e. the access time to each matrix cell.

This is a new and innovative way of looking at data and text compression, where homogeneous sub-areas with all '1' and all '0' values are excluded. Thus, it dramatically decreases the consumption of storage volume and of communication time.

EXAMPLE 9

Data Mining Methods and Processing

Data mining describes a collection of techniques that aim to find useful but undiscovered patterns in collected data. The main goal of data mining is to create models for decision making that predicts future behavior based on analysis of past activity.

Data mining extracts information from an existing database to reveal "hidden" patterns of relationship between objects in that data-base, which are neither known beforehand nor intuitively expected.

The term "data mining" expresses the idea that the raw material is the "mountain" of data and the data mining algorithm is the excavator, shifting through the vast quantities of raw data looking for the valuable nuggets of information.

However, unless the output of the data mining system can be understood qualitatively, it won't be of any use. I.e. a user needs to view the output of the data mining in a meaningful context to his goals, and to be able to disregard irrelevant patterns of the relations, which were disclosed.

In order to achieve this goal, recently techniques of dimension reduction were recently applied in order to reduce the vast quantity of relations of relations identified by data mining.

Dimension reduction selects relevant attributes in the dataset prior to performing data mining. This is important for the accuracy of further analysis as well as for performance. Because the redundant and irrelevant attributes could mislead the analysis, including all of the attributes in the data mining procedures not only increases the complexity of the analysis, but also degrades the accuracy of the result.

Dimension reduction improves the performance of data mining techniques by reducing dimensions so that data mining procedures process data with a reduced number of attributes. With dimension reduction, improvement in orders of magnitude is possible.

According to the present invention, the binary representation of data provides an innovative approach to data mining with dimension reduction. The feature extraction capability is the key to the dimension reduction. In additional, assigning unequal weights to the objects attributes-values, affect the similarity measure (PAD index) to reach the required mining target. Grouping and clustering of objects is performed in accordance to those features, which are a-priori suspected to be relevant (influential factors).

After grouping, correlation between the features of group members is accomplished by any known statistical mechanisms e.g. those which are used in data mining such as linear regression, nearest neighbor, clustering, process output empirical modeling (POEM), classification and regression tree (CART), chi-square automatic interaction detector (CHAID) and neural network empirical modeling.

Figure 12:
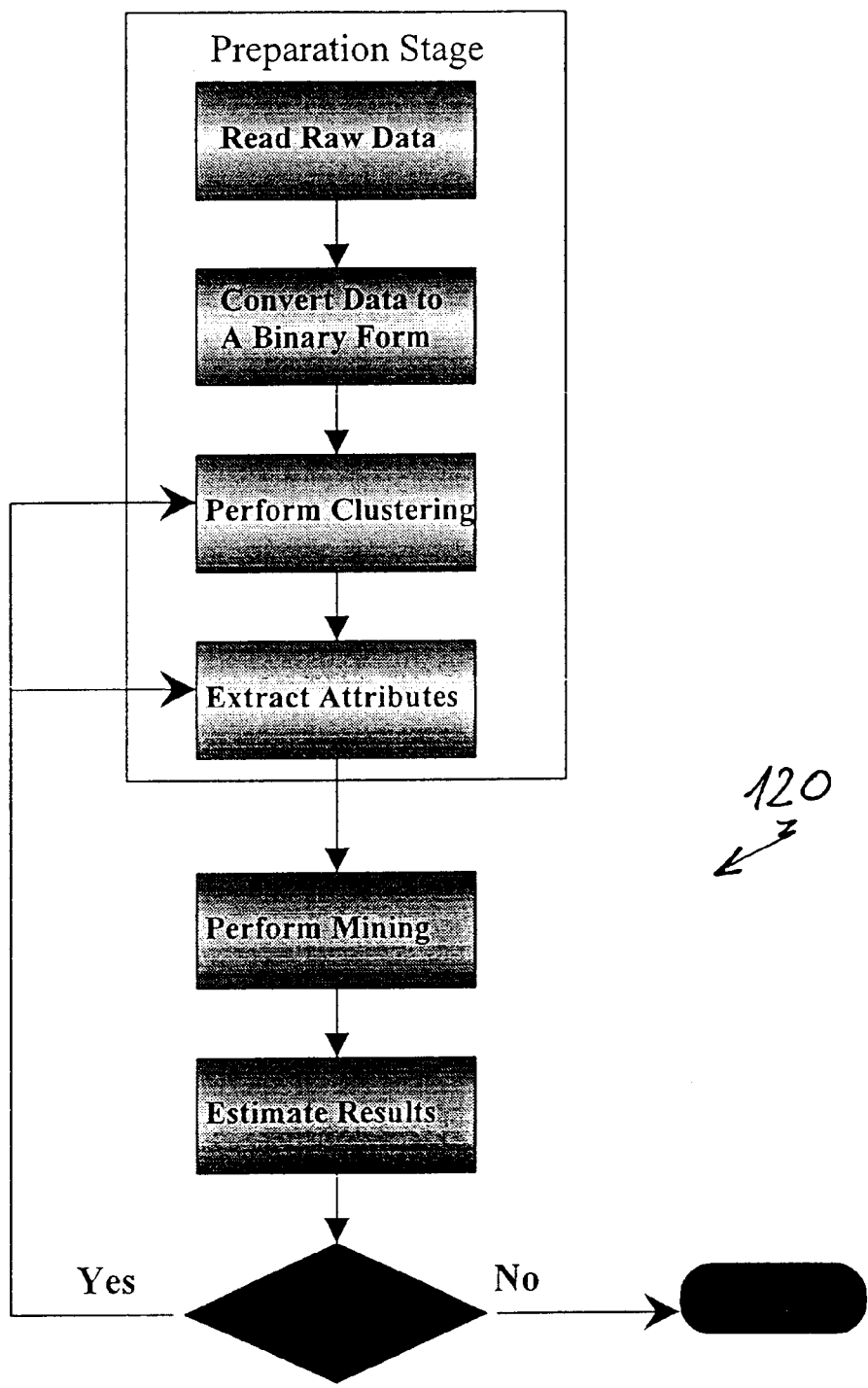
FIG. 12. shows a flow chart of a data mining process according to the present invention, and FIG. 13. shows a flow chart of text mining process in accordance to the present invention.

The data mining method according to the present invention includes two stages:
The Preparation Stage with the steps of:
   a. Read raw data from operational database system;
   b. Convert data into a binary form;
   c. Perform positive clustering to obtain number of groups;
   e. Extract attribute values (features) for specific use and,
The Knowledge Generation Stage with the steps of:
   e. Perform data mining within selected groups;
   f. Estimate results;
   g. If unsatisfied, repeat steps a. to f., Else End.
FIG. 12 to which reference is now made, shows a flow 120 of the aforementioned steps.

EXAMPLE 10

Processes and Methods for Text Mining

Text mining is the ability to handle unstructured data, i.e., text, web pages, documents, in order to identify and extract common features embedded into them. Such ability is key to subject searches, content definition and search engines on the Internet.

Based on the definition of language phrases by representing them in the simple binary format, text mining can be readily achieved. In addition, a binary representation of context, hierarchies, hypertexts, and mutual links between the context of web pages and unstructured text is the backbone for any text analysis and mining.

Figure 13:
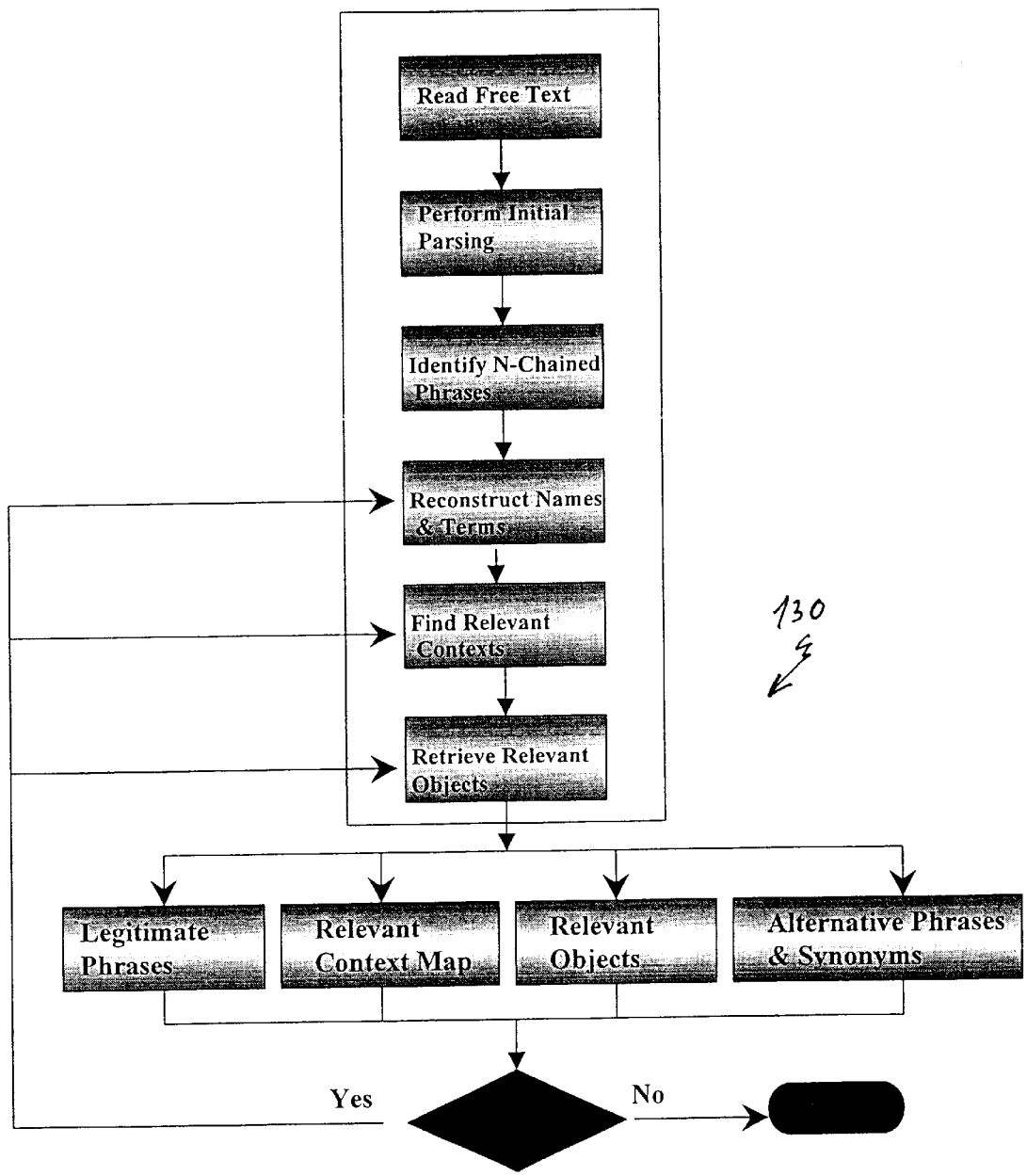

The Text mining method according to the present invention includes the stages of:
   a Read free form text;
   b. Perform initial parsing;
   c. Identify Binary N-Chained Phrases;
   d. Reconstruct names and terms;
   e. Find relevant contexts;
   f. Retrieve desired objects.
      Outputs: Legitimate Phrases, Relevant Context Map, Relevant Objects, Alternative Phrases and Synonyms.
   g. If unsatisfied repeat steps d–f., Else End.
FIG. 13 to which reference is now made, depicts the flow chart 130 of the text mining.

EXAMPLE 11

Database on a Chip

The binary approach is a base for database implementation in hardware. Such implementation results in fastest data mining operations. The converted (binary) database will be punched into a chip, card, or ROM (Read Only Memory). Putting data into hardware is a simple, one-to-one process, which requires no further transformation or coding. It is likely to provide processing speed (cause of the naive-binary representation), saving of storage volume (cause of the preserving compression capability), access speed (because of the "built-in" attributes indexing), and versatility, where relevant data may become part of palm, cellular, or any network devices in the near future.

EXAMPLE 12

A Method for Managing the Computer Primary Storage Space (RAM) by "Density" Level of the Data in the CPU The present invention is applied for the managing of the internal Random Access Memory (RAM) of a CPU in a non-lose information mode of data compression.

The order of objects (row order) and of attributes-values (column order) in the binary matrix is immaterial to the binary representation. Thus it is possible to change the inter-row and inter-column order in the binary matrix to get a partition into homogeneous sub-areas containing cells which fully consist of "1" or of "0". The homogeneous sub-areas are excluded of the binary matrix.

The next step is representing the homogeneity pattern of the matrix, i.e. representing the structure of the reduced binary matrix by a tree structure, and then changing the root of the tree in order to get a balanced tree, or any other required feature of the tree.

This is a new and innovative way of looking at computer storage, used for the storage of data and text as well (not only graphics), where homogeneous sub-areas with all '1' and all '0' values are not loaded to memory at all. Thus, primary storage contains only heterogeneous areas, i.e., those that contain both '1' and '0' bits.

The significance of this is saving memory space, sparing data transformation to machine level, eliminating excess calculation, providing pure Boolean operations, and enabling to run large applications on standard personal computers.

EXAMPLE 13

A Binary Representation for Data Warehouses and OLAP

Multi-dimensional binary data (N-dimension array) lends itself to support and enhance the common On Line Analysis Processing (OLAP) and related data warehousing technology. A data warehouse is a segment or view of data extracted from the operational database of a firm that is constructed to support managerial decision-making.

To enhance access, the warehouse data is organized in a multi dimensional space ("star" shape) thus allowing "drill down" into diverse dimensions of the data.

Still, volume and maintenance of the data warehouse are cumbersome. A binary space and even an n-dimensional array are claimed to be superior for such operations by at least an order of magnitude, by using the preserving compression capability, which was described in example 8.

In additional there is the possibility of binary representation of key words, names, terms, acronyms aliases and synonyms, which has been demonstrated before in conjunction to FIG. 2–FIG. 8, while FIG. 9 illustrates a binary cube useful for this application.

Figure 11:
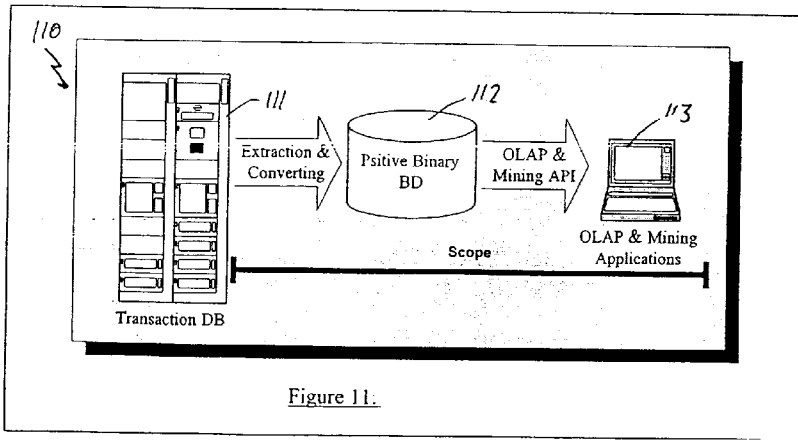
FIG. 11. shows the use of the binary representation in exchanging, data between data warehouses and on line analytical processors.

Shown in FIG. 11, data is extracted from a database warehouse 111 and stored as a positive binary database in a storage space 112 from which it is further extracted to be used by an On Line Analytical processor (OLAP) 113.

EXAMPLE 14

Adaptive Network Addressing and Routing

With the limited resources in memory and power of the special processors at network nodes (called IMP processors), representing the network, addresses and conditions in a binary format, including the actual routing, will be efficient and fast. All this without any loss of information.

The most significant feature of an adaptive routing scheme is its ability to sense changes in the traffic distribution and the load conditions throughout the net, and modify the routes accordingly. The binary model provides:

(a) The assembling and detecting address name using Binary N-Chained Phrase technique.

(b) The use of decision tables that enable an efficient storage all conditions and actions based on network changes.

(c) It is possible to represent only the available and open nodes to all other nodes, and not the entire network, saving valuable storage in the routing mechanism.

(d) The representation of the shortest paths leading to each node from all other nodes.

(e) Memory, which is dependent on size and hierarchical levels of the net, is significantly saved as the binary model is independent on the number of levels or span of the hierarchical tree.

What is claimed is:

1. A knowledge tool for describing a proximity pattern between objects, comprising of:

a binary representation of a plurality of objects, said binary representation relates said plurality of objects to a vector of attributed values by assigning a positive binary bit to an element in an $i^{th}$ row and a $j^{th}$ column of a matrix in which the plurality of objects and said vector are set in a row and column format;

(b) a similarity index between objects in each couple of objects among the plurality of objects, said similarity index is related to a number of said positive binary bits common to the objects in said each couple of objects being represented by said binary representation, and (c) an object distance matrix in which the plurality of object is set in a row and column format, wherein an entry in a matrix element of an $i^{th}$ row and a $j^{th}$ column of said obiect distance matrix is said similarity index between the objects in said each couple of objects which consists of an object in said $i^{th}$ row and an obiect in said $j^{th}$ column of said object distance matrix respectively.

2. The tool as in claim 1 wherein said objects are included in data sets selected from a group consisting of graphs, directed graphs, trees, classes and records.

3. The knowledge tool as in claim 1 wherein said proximity pattern includes relations selected from the group consisting of influences, constrains and conditions.

4. The knowledge tool as in claim 1 wherein said knowledge tool is included in procedures which are selected from the group consisting of decision tables, routing, programming and logic inference.

5. The knowledge tool as in claim 1 wherein said objects are selected from the group consisting of names, terms, acronyms, aliases and synonyms.

6. The knowledge tool as in claim 1 wherein said objects are arranged in formats which are selected from the group consisting of contexts, hierarchies, hypertexts, unstructured text and mutual links between context within the scope of web pages.

7. An automatic method for classification between at least two objects according to a similarity or a distinction between the objects comprising the stages of:

(a) representing the objects by a binary representation in which attributes of the objects are features which are relevant to the similarity;

(b) calculating a similarity index between said at least two objects, said similarity index is proportional to a number of said attributes common to said at least two objects being represented by said binary representation, and (c) comparing said at least two objects by evaluating a degree of similarity between said at least two objects in accordance to a value of said similarity index.

8. A method for preserving a compression capability of a database comprising the stages of:

(a) representing the data in the database by a binary matrix;

(b) interchanging an order between rows and an order between columns of said binary matrix, as to partition said binary matrix into approximate homogeneous sub-areas containing cells of "1" or "0" only;

(c) excluding said homogeneous sub-areas of said binary matrix so to get a reduced binary matrix, which is loaded into a data storage space;

(d) symbolizing said homogeneity sub-areas by a tree structure, and (e) changing the root of said tree in order to get a required feature of said tree structure.

9. An automatic method for grouping a plurality of objects according to their similarity, the method comprises the stages of:

(a) representing the objects by a binary representation matrix with positive attribute values, in which the rows being the objects and the columns consist of attributes relevant to grouping;

(b) calculating an index of similarity for each pair of objects among the plurality of objects;

(c) building an object similarity matrix in which an entry in a matrix element of an intersection between two objects, is said index of similarity between said two objects, and (d) scanning said similarity matrix to chose pairs of objects having said similarity index of at least a pre-selected value, each of said chosen pair of objects consist a clustering candidate respectively.

10. The automatic method as in claim 9 further comprising the steps of:

(e) evaluating an homogeneity index for a joint group which will be formed by an association of two said clustering candidates having a common member, and (f) deciding in accordance to pre-selected thresholds of values of evaluators whether said two clustering candidates qualify to be merged into said joint group.

11. The automatic method as in claim 10 wherein said evaluators are selected from the group consisting of said homogeneity index, a within class distance, a between class distance, a total group quality index and combinations thereof.

12. The automatic method as in claim 11 wherein an object among said plurality of objects consists of a cluster among entities.

13. The automatic method as in claim 12 used to extract entities among said plurality of objects, wherein said attributes relevant to said grouping, are features characteristic to each of the extracted entities.

14. The automatic method as in claim 13, which is included in a pattern recognition procedure.

15. The automatic method as in claim 13, which is included in a driver of a search engine.

16. A computer-executable method for data mining comprising the stages of:

(a) defining attributes which are considered a-priori by an expert opinion to be meaningful to an output of a data mining process;

(b) reading raw data from operational database system and converting said data into objects of a binary representation in a binary matrix in which columns consist of said attributes;

(c) performing positive clustering of said converted data according to a similarity which is based on said attributes to obtain a number of groups, and (d) executing data mining within said groups.

17. A computer-executable method for text mining comprising the stages of:

(a) defining attributes which comprises words considered a-priori to be included in an N-chain phrase;

(b) reading a free form text and performing initial parsing of said text;

(c) identifying and reconstructing said binary N-chain phrase, and (d) retrieving said N-chain phrases in relevant contexts.

18. The computer-executable method as in claim 17 wherein said words are selected from the group consisting of names, terms, acronyms, aliases and synonyms.

19. The compute-executable method as in claim 17 wherein said contexts are selected from the group consisting of unstructured text, hierarchies, hypertexts, unstructured data and web pages.

20. The automatic method as in claim 9 wherein said binary representation of objects is implemented on hardware.

21. The computer-executable method as in claim 20 wherein said hardware is selected from the group consisting of a chip, a card or a read only memory.

22. An automatic method for adaptive network addressing and routing, which comprises the stages of:

(a) binary representation of a state of connectivity between at least two addresses and (b) routing information between said at least two addresses in accordance to said binary representation.

23. A method of data management between data warehouses and on line analysis processors, the tool method comprises the stages of:

(a) a multi-dimension binary representation of data in the data warehouse; in which the dimension of the representation equals or exceeds a three-dimensional cube;

(b) extracting said data from data warehouse and storing it as a positive binary data base in a storage space, and (c) transferring said positive binary data from said storage space to an on line analytical processor.

24. A method for managing database in a storage space of a computer the method comprising the stages of:

(a) representing the data in the database by a binary matrix;

(b) interchanging an order between rows and an order between columns in said binary matrix as to partition said binary matrix into homogeneous sub-areas containing cells of "1" or "0" only, and (c) excluding said homogeneous sub-areas of said binary matrix so as to get a reduced binary matrix and loading said reduced binary matrix into the storage space of the computer.

* * * * *